US005409557A

United States Patent [19]

Mammino et al.

[11] Patent Number: 5,409,557

[45] Date of Patent: Apr. 25, 1995

[54] METHOD OF MANUFACTURING A REINFORCED SEAMLESS INTERMEDIATE TRANSFER MEMBER

[75] Inventors: Joseph Mammino; Donald S Sypula, both of Penfield; John S. Berkes, Webster; Edward L. Schlueter, Jr., Rochester; Gerald M. Fletcher, Pittsford; Frank J. Bonsignore, Rochester; Shy-Shung Hwang, Penfield; Donald J. Robertson, Fairport; Allen W. Denham, Williamson; Paul J. Brach, Rochester; Dennis A. Abramsohn, Pittsford, all of N.Y.

[73] Assignee: Xerox Corporation, Stamford, Conn.

[21] Appl. No.: 176,377

[22] Filed: Jan. 3, 1994

Related U.S. Application Data

[62] Division of Ser. No. 957,140, Oct. 7, 1992, Pat. No. 5,298,956.

[51] Int. Cl.[6] .......................... F16G 1/14; F16G 1/16

[52] U.S. Cl. .................................... 156/137; 264/320; 355/271; 355/273; 355/275; 474/268; 430/126

[58] Field of Search ............................... 156/137-140, 156/242, 245; 474/268; 355/271, 272, 273, 277, 275, 280, 281, 278, 274; 430/126; 264/320, 324

[56] References Cited

U.S. PATENT DOCUMENTS

| | | | |
|---|---|---|---|
| 2,990,278 | 6/1961 | Carlson . | |
| 3,374,769 | 3/1968 | Carlson . | |
| 3,591,276 | 7/1971 | Byrne . | |
| 3,754,986 | 8/1973 | Perez-Albuerne . | |
| 3,893,761 | 7/1975 | Buchan et al. . | |
| 3,954,568 | 5/1976 | DuPree . | |
| 3,957,367 | 5/1976 | Goel . | |
| 4,066,732 | 1/1978 | Redmond, Jr. | 156/140 X |

(List continued on next page.)

FOREIGN PATENT DOCUMENTS

| | | |
|---|---|---|
| 0158474 | 8/1985 | Japan . |
| 0311263 | 12/1988 | Japan . |
| 1067516 | 5/1967 | United Kingdom . |

OTHER PUBLICATIONS

Sharp Service Manual, Model CX-7500, Sharp Corporation.

The Journal of Chemical Physics, vol. 53, No. 9, 3759-3761, Nov. 1970, "Critical Density in Percolation Processes," Scher et al.

Modern Plastics Encyclopedia, 1986-1987, "Liquid Crystal Polymers," Brinegar.

The Encyclopedia of Engineering Materials and Processes, 1963.

Hexcel Fine Organics, Specialty Chemicals, Organic Compounds, Quaternary Ammonium Compounds Polymer Additives and Specialty Synthesis.

*Primary Examiner*—Jeff H. Aftergut
*Attorney, Agent, or Firm*—Oliff & Berridge

[57] ABSTRACT

A seamless intermediate transfer member has a reinforcing member in an endless configuration, a filler material such as a polymer and electrical property regulating material to regulate the electrical properties such as surface and bulk resistivity, dielectric constant and charge dissipation. The seamless intermediate transfer member also has good mechanical properties. The reinforcing member can be prepared by any suitable method such as by weaving. Filler material and electrical regulating material can be applied on, around or embedded into the reinforcing member. The member can be employed in an electrostatographic imaging system with more than one toner imaging station. The member can pick up a separate image from each individual imaging station and transfer the combined image to a suitable substrate. The seamless intermediate transfer member is capable of dissipating charge between toner imaging stations, achieving good transfer efficiencies and has a non-stretch characteristic to attain good registration of a toner image.

33 Claims, No Drawings

U.S. PATENT DOCUMENTS 4,183,658 1/1980 Winthaegen .
4,265,990 5/1981 Stolka et al. .
4,478,922 10/1984 Perlstein et al. .
4,501,646 2/1985 Herbert .
4,518,976 5/1985 Tarumi et al. .
4,531,825 7/1985 Miwa et al. .
4,556,309 12/1985 Weber et al. .
4,684,238 8/1987 Till et al. .
4,690,539 9/1987 Radulski et al. .
4,740,798 4/1988 Shinoazaki .
4,747,992 5/1988 Sypula et al. .................... 264/131 X
4,814,822 3/1989 Acquaviva et al. .
4,932,839 6/1990 Tompkins et al. .
4,952,293 8/1990 Sypula et al. ...................... 264/24 X
4,984,026 1/1991 Nishise et al. .
4,999,677 3/1991 Landa .
5,008,169 4/1991 Yu et al. .
5,021,109 6/1991 Petropoulos et al. .
5,028,964 7/1991 Landa et al. .
5,040,028 8/1991 Kamimura et al. .
5,071,608 12/1991 Smith et al. .
5,089,856 2/1992 Landa et al. .
5,099,286 3/1992 Nishise et al. .
5,100,628 3/1992 Griffiths et al. .
5,103,260 4/1992 Tompkins et al. .
5,110,702 5/1992 Ng et al. .
5,119,134 6/1992 Haneda et al. .
5,119,140 6/1992 Berkes et al. .
5,150,161 9/1992 Bujese .
5,182,598 1/1993 Hara et al. .
5,208,638 5/1993 Bujese et al. .

METHOD OF MANUFACTURING A REINFORCED SEAMLESS INTERMEDIATE TRANSFER MEMBER

This is a division of application Ser. No. 07/957,140, filed Oct. 7, 1992, now U.S. Pat. No. 5,298,956.

BACKGROUND OF THE INVENTION

This invention relates to reinforced seamless intermediate transfer members. More particularly, this invention relates to seamless reinforced intermediate transfer members for electrostatic transfer of a toner image, comprising a reinforcing member with filler material on, around or embedded in the reinforcing members and electrical regulating materials and methods of making the same.

Intermediate transfer members are well known and have been used extensively in electrophotographic imaging systems. For example, in dry electrophotographic printing machines, multicolor copying has been achieved with the utilization of an intermediate roller as disclosed in U.S. Pat. No. 3,957,367. In devices of this type, successive toner powder images are transferred in superimposed registration with one another, from the photoconductive drum to an intermediate roller. The multicolored image is then transferred to a copy sheet.

An example of a commercial machine which uses an intermediate transfer belt to generate one full color print is the Sharp CX 7500. The Sharp CX 7500 comprises a single photoreceptor. An intermediate transfer member is supported for movement in an endless path such that incremental portions thereof move past the photoreceptor four times enabling sequential transfer of four different color toner images to the intermediate transfer member in superimposed registration with one another.

Other examples of apparatuses using belts as intermediate transfer members can be found in U.S. Pat. Nos. 4,684,238; 4,690,539; 4,183,658; 5,099,286; and 5,119,140.

It has been a goal of workers in this art to develop a seamless intermediate transfer member which optimally satisfies both desirable mechanical properties, such as tensile modulus as well as desirable electrical properties such as surface and bulk resistivity. Such a seamless member also would provide a more reliable electrophotographic imaging device since there would be no mechanical failure of the member at the seam, no thickness increase to cause clearance problems or motion noise and no undesirable toner build-up at the seam.

Many belts are formed by molding or lamination. Such molding is carried out in complex and expensive molds. Molded articles contain flashings that require removal to achieve a smooth outer surface. Laminated belts are usually prepared by applying alternate layers of thermoplastic sheets and reinforcing fabrics. These materials are relatively thick and stiff, and are not suitable for extended cycling over small diameter pulleys or rolls. Belts also have been prepared by welding opposite ends of sheets together to form belts having an undesirable seam which projects above the surface of the belt.

The resulting welded seam on the intermediate transfer member disrupts the continuity of the outer surface of the intermediate transfer member and must be indexed so that it does not print out during an imaging cycle. In other words, efficient stream feeding of paper and throughput are adversely affected because of a necessity to detect a seam within the length of each sheet of paper. Seam detection is a particularly vexing problem for smaller copier and printer designs. A mechanical and optical device is required for indexing the seam and adds to the complexity and cost of copiers, duplicators and printers, and reduces the flexibility of design. Welded belts also are less desirable for electrophotographic imaging systems because the seam forms a weak point in the belt and also collects toner debris during cleaning, particularly with wiper blade cleaning devices. The seam and wiper blade interaction also causes a disruption in motion quality which impacts registration and timing in applications where multiple images must be closely referred to each other.

Examples of intermediate transfer members can be found in U.S. Pat. No. 5,110,702 which discloses an intermediate transfer roll for nonelectrostatic transfer of toned images and U.S. Pat. No. 3,893,761 which discloses an intermediate transfer belt having a polyimide film substrate coated with 0.1-10 mils of silicone rubber or a fluoroelastomer.

U.S. Pat. Nos. 4,684,238 and 4,690,539 disclose intermediate transfer belts composed of polyethylene terephthalate or other suitable polypropylene material.

U.S. Pat. No. 5,119,140 discloses a single layer, non-reinforced intermediate transfer belt preferably fabricated from clear Tedlar, carbon loaded Tedlar or pigmented Tedlar. Such single layer, non-reinforced transfer belts have the disadvantage that their dimensions can change during the printing process resulting in image distortion printed substrates.

U.S. Pat. No. 5,099,286 discloses an intermediate transfer belt comprising electrically conductive urethane rubber reportedly having a volume resistivity of 103 to 104 ohm-cm and a dielectric layer of polytetrafluoroethylene reportedly having a volume resistivity equal to or greater than $10^{14}$ ohm-cm. These volume resistivities can lead to equal electrical potentials over the whole belt when a potential is applied at any point along the belt. This makes it impossible to generate different potentials in different areas along the belt for effective tandem image toner transfer.

None of these patents disclose or suggest an intermediate transfer member having both good mechanical properties and good electrical properties.

Consequently, there is still a need for a seamless intermediate transfer member having improved mechanical as well as electrical properties.

SUMMARY OF THE INVENTION

The present invention provides a seamless intermediate transfer member comprising a reinforcing member in an endless configuration having filler material and electrical property regulating material on, around or embedded in the reinforcing member. This seamless intermediate transfer member has both good mechanical properties and good electrical properties.

DETAILED DESCRIPTION OF PREFERRED EMBODIMENTS

The present invention is directed to an endless intermediate transfer member and process for making the same and an imaging process for using the member. The member can be in the shape of a belt, sleeve, tube or roll. The seamless intermediate transfer member comprises a reinforcing member in an endless configuration. The reinforcing member can be made of metal, synthetic material or fibrous material. Preferably, the reinforcing member comprises a fibrous material. Fibrous reinforcing members preferably contain fibers ranging in average diameter from about 0.05 mils to about 2 mils. Examples of natural fibers which may make up the reinforcing member include, but are not limited to, cotton, flax, silk or wool. Other suitable fibers include, but are not limited to, hemp, jute, ramie, coir, kapok, hair, leaf, silk and asbestos as disclosed in *The Encyclopedia of Engineering Materials and Processes*, Reinhold Publishing Corporation Chapman and Hall, Ltd., London, page 863, 1963, the entire disclosure of which is hereby incorporated herein by reference. The fibers may be monofilament or spun into thread and may be continuous strands or cut into lengths of less than about 0.1 to about 0.75 inches.

If the reinforcing member is a metal, the metal employed can include copper, tin, lead, cobalt, chromium, nickel, silver, gold, titanium, molybdenum, tungsten or alloys such as steel or stainless steel. If the reinforcing member is a synthetic material, synthetic materials such as liquid crystal polymers, graphite, nylon, rayon, polyester, Kevlar (aromatic polyamide obtainable from E. I. dupont de Nemours), Nomax, Peek (polyethoxyether ketones available from ICI) and the like or blends and mixtures thereof can be employed. Preferred synthetic materials include aromatic polyamides, polyethoxyether ketones, polyesters, and liquid crystal polymers such as VECTRA (obtainable from Hoechst Celanese). Glass fibers also may be employed. The reinforcement material comprises about 10% to about 50%, preferably about 10% to about 30% by weight of the member.

A reinforcing member of fibrous material can be prepared by weaving fibrous material into a matt or sheet as practiced in the art or the fibrous material may be held together in nonwoven form with or without a bonding agent as practiced in the art. Such methods are disclosed in *The Encyclopedia of Engineering Materials and Processes*, pages 235–240, 1963, the entire disclosure of which is hereby incorporated herein by reference. If the reinforcing member is not an endless loop, the two ends of the member can be joined by welding, and the resulting seam can be coated with filler material and sanded to produce a seamless belt by mechanical devices such as a pad or roller with single or multiple grades of abrasive surfaces, a skid plate, electronic laser ablation mechanism or chemical treatment as practiced in the art.

Reinforcing members of metal or synthetic material can be prepared according to methods well known in the art. Typically, metal or synthetic material can be electrodeposited on a mandrel or on the interior surface of a sleeve electrode. Examples of such methods are described in U.S. Pat. Nos. 4,747,992 and 4,952,293 which are hereby incorporated herein by reference.

Prior to coating the reinforcing member, the reinforcing member is preferably tensioned to acquire appropriate dimensions by stretching and wrapping around a mandrel of the appropriate size with a tension of about 1 to 50 lbs/inch.

At least one type of filler material is applied on, around or embedded in the reinforcing member. Filler material is applied to the reinforcing member such that the final member thickness ranges from about 2 mils to about 7 mils but preferably from about 3 mils to about 5 mils. The filler material is a film forming polymer. Blends or mixtures of such polymers also can be employed. Generally, polymers or blends of polymers comprise from about 20% by weight to about 50% by weight of the member. Preferably polymers comprise from about 25% to about 40% by weight of the member. The combination of the materials of the reinforcing member and filler provides the improved mechanical strength of the member.

Preferred film forming polymers for filler material which can be used to practice this invention include, but are not limited to, polyvinyl fluoride (e.g., Tedlar available from E. I. dupont de Nemours), polyvinylidene fluoride (e.g., Kynar 7201, Kynar 301F and Kynar 202, all available from Pennwalt Co.), polytetrafluoroethylene (e.g. Teflon, available from E. I. DuPont de Nemours & Co.) and other fluorocarbon polymers and Viton B-50 (blend of vinylidene fluoride and hexafluoropropylene copolymer) and Viton GF (blend of vinylidene fluoride, hexafluoropropylene and tetrafluoroethylene terpolymer). Other film forming polymers include polybutadiene and copolymers with styrene, vinyl/toluene, acrylates, polyaryl sulfone, polyethylene and polypropylene, polyimide, polyethylpentene, polyphenylene sulfide, polystyrene and acrylonitrile copolymers, polyvinylchloride and polyvinyl acetate copolymers and terpolymers, silicones, acrylics and copolymers, alkyd polymers, amino polymers, cellulosic resins and polymers, epoxy resins and esters, nylon and other polyamides, phenoxy polymers, phenolic polymers, phenylene oxide polymers, polycarbonates (e.g. Makrolon 5705, available from Bayer Chemical Co., Merlon M39, available from Mobay Chemical Co., Lexan 145, available from General Electric Co.), polysulfones (e.g. P-3500, available from Union Carbide Corp.), polyesters (e.g. PE-100 and PE-200, available from Goodyear Tire and Rubber Co.), polyarylates, acrylics, polyarylsulfones, polybutylenes, polyether sulfones, polyphenylenesulfides, polyurethanes, poly(amide-imides) (e.g. A1830, available from AMOCO Chemical Corp.), copolyesters (Kodar Copolyester PETG 6763 available from Eastman Kodak Co.), polyetherimides (e.g. available from General Electric Co.), polyarylethers, and the like and mixtures thereof. Polycarbonate polymers may be made according to methods known in the art, for example, from 2,2-bis(4-hydroxyphenol)propane; 4,4′-dihydroxy-diphenyl-1,1-ethane; 4,4′-dihydroxy-diphenyl-1,1-isobutane; 4,4′-dihydroxy-diphenyl-4-heptane; 4,4′-dihydroxy-diphenyl- 2,2-hexane; 4,4′-dihydroxy-triphenyl-2,2,2-ethane; 4,4′- dihydroxy-diphenyl-1,1-cyclohexane; 4,4′-dihydroxy-diphenyl-β-β-decahydronaphthalene; cyclopentane derivatives of 4,4′dihydroxy-diphenyl-β-β-decahydronaphthalene; 4,4′-dihydroxy-diphenyl-sulphone; and the like.

The film forming polymers can be applied on, around or embedded into the reinforcing member by any suitable method practiced in the art. Typical techniques for coating polymeric materials on the reinforcing member include liquid and dry powder spray coating, dip coating, wire wound rod coating, fluidized bed coating, powder coating, electrostatic spraying, sonic spraying, blade coating and the like. If a coating is applied by spraying, spraying can be assisted mechanically and/or electrically such as by electrostatic spraying.

A typical spray gun which can be employed in applying a film forming polymer to the reinforcing member comprises a central fluid nozzle surrounded closely by an annular concentric air nozzle. The fluid is forced out through the fluid nozzle either by a vacuum created by gas flow through the annular concentric nozzle or by pressurizing the fluid container. The shape of the spray pattern can be varied from circular to elliptical by gas pressure applied through apertures and impinging at an angle to the main droplet stream. A typical spray gun having these features is model 21 spray gun available from Binks Company, Franklin Park, Ill.

Typically, the reinforcing member is wrapped around a mandrel to be coated with filler material. Any suitable material may be used for the mandrel. The mandrel should be dimensionally and thermally stable at processing temperatures utilized, i.e., from about 20° C. to about 300° C. The mandrel may be uncoated or, if desired, coated with a suitable release coating well known in the art prior to applying reinforcing material on the mandrel. Typical metallic mandrel materials include metals such as aluminum, stainless steel, nickel, chromium, copper, brass and the like. Typical polymeric mandrel materials include polyethylene, polypropylene, polymethylpentane, copolymers thereof and the like. Typical ceramic mandrel materials include ceramic, glass, clay and the like.

Preferably, for optimum uniform coating of the reinforcing material, the mandrel is rotated about its axis and the spray gun traversed in a direction parallel to the mandrel axis. The deposited polymeric material should be uniform, smooth and free from blemishes such as entrained gas bubbles and the like.

In addition to filler materials, electrical property regulating materials also can be added to the reinforcing member to regulate electrical properties such as surface and bulk resistivity, dielectric constant and charge dissipation. In general, electrical property regulating materials are selected based upon the required resistivity of the film. High volume fractions or loadings of the electrical property regulating materials are used so that the number of conductive pathways is always well above the percolation threshold, thereby avoiding extreme variations in resistivity. The percolation threshold of a composition is a volume concentration of dispersed phase below which there is so little particle to particle contact that the connected regions are small. At higher concentrations than the percolation threshold, the connected regions are large enough to traverse the volume of the film. Scher, et al., Critical Density in Percolation Processes, The Journal of Chemical Physics, Vol. 53, No. 9, 3759–3761, 1 November 1970, discusses the effects of density in percolation processes.

Particle shape of the electrical property regulating material will influence volume loading. Volume loading will depend on whether the particles are, for example, spherical, round, irregular, spheroidal, spongy, angular, or in the form of flakes or leaves. Particles having a high aspect ratio do not require as high a loading as particles having a relatively lower aspect ratio. Particles which have relatively high aspect ratios include flakes and leaves. Particles which have a relatively lower aspect ratio are spherical and round particles.

The percolation threshold is an idealized concept and practically is within a range of a few volume per cent depending on the aspect ratio of the loadent. For any particular particle resistivity, the resistivity of the coated film can be varied over about one order of magnitude by changing the volume fraction of the resistive particles in the layer. This variation in volume loading enables easy fine-tuning of resistivity.

The resistivity varies approximately linearly proportionately to the bulk resistivity of the individual particles and the volume fraction of the particles in the reinforcing member. These two parameters can be selected independently. For any particular particle resistivity, the resistivity of the reinforcing member can be varied over roughly an order of magnitude by changing the volume fraction of the particles. The bulk resistivity of the particles is preferably chosen to be up to three orders of magnitude lower than the bulk resistivity desired in the member. When the particles are mixed with the reinforcing member in an amount above the percolation threshold, the resistivity of the resulting reinforcing member decreases in a manner proportional to the increased loading. Fine tuning of the final resistivity may be accurately controlled on the basis of this proportional increase in resistivity.

The bulk resistivity of a material is an intrinsic property of the material and can be determined from a sample of uniform-cross-section. The bulk resistivity is the resistance of such a sample times the cross-sectional area divided by the length of the sample. The bulk resistivity can vary somewhat with the applied voltage.

The surface or sheet resistivity (expressed as ohms/-square) is not an intrinsic property of a material because it depends upon the material thickness and the contamination of the material surface, especially with condensed moisture. When surface effects are negligible and bulk resistivity is isotropic, the surface resistivity is the bulk resistivity divided by the reinforcing member thickness. The surface resistivity of a film can be measured without knowing the film thickness by measuring the resistance between two parallel contacts placed on the film surface. When measuring surface resistivity using parallel contacts, one uses contact lengths several times longer than the contact gap so that end effects do not cause significant errors. The surface resistivity is the measured resistance multiplied by the contact length to gap ratio.

Particles are chosen which have a bulk resistivity slightly lower than the desired bulk resistivity of the resulting member. These electrical property regulating materials include, but are not limited to pigments, quaternary ammonium salts, dyes, conductive polymers and the like. Electrical property regulating materials may be added in amounts ranging from about 1% by weight to about 50% by weight of the total weight of the member. Preferably, electrical regulating materials can be added in amounts ranging from about 5% to about 35% by weight of the total weight of the member.

Suitable pigments may include phthalocyanine pigments, such as metal free phthalocyanines, metal phthalocyanines such as vanadyl phthalocyanine, titanyl phthalocyanine and copper phthalocyanine and other phthalocyanines known in the art. Also tetrathiafulvalene tetracarbonic acid tetraethyl ester, octamethylthio-dibenzo-tetrathiafulvalene, octabenzylthio-dibenzo-tetrathiafulvalene, 4,4'-di-phenyl-tetrathiafulvalene, tetrathiafulvalene, bis-tetramethylene-tetrathiafulvalene, 4,4'-di-phenyl-tetrathiafulvalene, 4,4'-di-phenyl-tetrathiafulvalene, 4,4'-di-phenyl-tetrathiafulvalene, tetrathiafulvalene tetracarbonic acid, bis-dihydronaphtho(a)-tetrathiafulvalene, tetrathiafulvalene tetracarbonic acid-tetramethylester, octaethylthio-dibenzo-tetrathiafulvalene, bis-ethylenedithio-tetrathiafulvalene, and tetracyano-tetrathiafulvalene can be employed. Other suitable pigments include, but are not limited to, zinc oxide, tin oxide, titanium dioxide, carbon black, amorphous selenium, trigonal selenium, selenium alloys such as selenium-tellurium, selenium-tellurium-arsenic, selenium arsenide and the like and mixtures thereof. Other suitable pigments include those disclosed in U.S. Pat. Nos. 4,478,922 and 3,754,986 the entire disclosures of which are hereby incorporated herein by reference. Table I also discloses suitable electrical property regulating materials.

TABLE I

Electrical Property Regulating Material

Compound

Charge Transfer Salts

Cu TCNQ

K TCNQ

Na TCNQ

Li TCNQ

Fe $(phen)_3^{++}(TCNQ)_2$

Ni $(phen)_3^{++}(TCNQ)_2$ $(Phen)_3CH_3P$ (TCNQ)

Complexes

Anthracene TCNQ

Pyrene TCNQ

Macrocyclic Compounds (n=2–25)

$[Si(phthalocyaninato)O]_n$ $[Sn(phthalocyaninato)O]_n$ $[Ge(phthalocyaninato)O]_n$ $[t\text{-}Bu_4phthalocyaninato\ GeO]_n$ $[t\text{-}Bu_4phthalocyaninato\ SnO]_n$ $[(bipy)phthalocyaninato\ iron]_2$ Dithiolene Compounds and Complexes $Cu^{2+}Ni(S_2C_2(CN)_2)_2^{2-}$ $H^{2+}Cu(S_2C_2(CN)_2)_2^{2-}$ $Ni^{2+}CU(S_2C_2(CN)_2)_2^{2-}$ $Co^{2+}Co(S_2C_2(CN)_2)_4^{2-}$ $Co^{2+}Cu(S_2C_2(CN)_2)_2^{2-}$ $Ni(S_2C_2Ph_2)_2$ $Ni(S_2C_2Me_2)_2$ $Fe_2(S_2C_2Ph_2)_4$ TABLE 1 (continued)

$Fe^{2+}Fe_2(S_2C_2(CN)_2)_4^{2-}$ $(NMe_4^+)_2Cu(S_2C_2(CN)_2)_2^2$ $Mo(S_2C_2H_2)_3$ $H^+Fe_2(S_2C_2(CN)_2)_4$ $W(S_2C_2Ph_2)_4$ $NMe_4{+}Fe_2(S_2C_2(CN)_2)_4^{2-}$ $MO(CO)_2(S_2C_2Me_2)_2$

In Table I, TCNQ represents tetracyanoquinodimethane. Other TCNQ complexes which may be used in the invention include quinoline $(TCNQ)_2$ and other similar complexes.

Suitable dyes may include, but are not limited to, dibromoanthanthrone, squarylium and quinacridones available from DuPont under the tradenames Monastral Red, Monastral Violet and Monastral Red Y, Vat Orange 1 and Vat Orange 3. Other suitable dyes include, but are not limited to, benzimidazole perylene, substituted 2,4-diamino-triazines and polynuclear aromatic quinones available from Allied Chemical Corporation and the like.

Suitable quaternary ammonium salts include, but are not limited to, cetyl dimethylethyl ammonium bromide, cetyl trimethyl ammonium bromide, cetyl trimethyl ammonium p-toluene sulfonate, cetyl dimethyl benzyl ammonium chloride monohydrate, cetyl pyridium chloride monohydrate, alkyl dimethyl benzyl ammonium chloride dihydrate, alkyl dimethyl benzyl ammonium chloride, alkyl dimethyl benzyl ammonium chloride, myristyl trimethyl ammonium bromide, alkyl dimethyl benzyl ammonium chloride, alkyl dimethyl benzyl ammonium chloride, alkyl dimethyl benzyl ammonium chloride, stearyl dimethyl benzyl ammonium chloride monohydrate, ANTISTAT 106-G and ANTISTAT 273-C (obtainable from Hexcel®, Lodi, N.J.), (3-lauramidopropyl)trimethylammonium methyl sulfate, stearamidopropyldimethyl-2-hydroxyethylammonium nitrate, stearamidopropyldimethyl-2-hydroxyethyl ammonium dihydrogenphosphate and N,N-bis(2-hydroxyethyl)-N-(3-dodecyloxy-2-hydroxypropyl) methylammonium methosulfate.

Suitable conductive polymers may include, but are not limited to, polyaniline, polyacetylene, polypyrrole and the like.

These electrical property regulating materials can be applied on, around or embedded into the reinforcing member by employing similar methods as for the filler materials. Preferably, electrical property regulating materials are mixed or dispersed with the filler material in a suitable solvent such as methylene chloride and 1,1,2-trichloroethane, toluene, methylethyl ketone, butylacetate, isopropyl alcohol, tetrahydrofuran, n-methyl pyrrolidone and the like, followed by applying the mixture to a reinforcing member. The electrical property regulating materials can be mixed with filler materials employing any suitable method practiced in the art. Typical mixing methods include use of stirring rods, ultrasonic vibrators, magnetic stirrers, paint shakers, sand mills, roll pebble mills, sonic mixers, melt mixing devices and the like.

The reinforcing member comprising filler material and electrical property regulating material can be dried at temperatures ranging from about 20° C. to about 300° C., preferably from about 30° C. to about 200° C., to remove solvent and dried or cured to cross-link filler materials. This results in filler material and electrical property regulating material becoming coated around the reinforcing member. Filler materials may be embedded into the reinforcing member through the use of solvents, heat or mechanical impaction.

A surface coat can be applied to produce a low surface energy and make the member easier to clean. The surface coat can comprise, for example, a fluoropolymer or silicone coating. The coating may be applied by methods well known in the art. Examples of suitable fluoropolymers include, but are not limited to, polyvinyl fluoride, polyvinylidene fluoride, amorphous tetrafluoroethylene and the like. Suitable silicones include, but are not limited to, silanol, acetoxy, methyldiacetoxy, chlorine, dimethylamine and ethoxy terminated polydimethylsiloxanes and the like.

After coating the member, if a belt, it is trimmed to a width size ranging from about 6 inches to about 20 inches, preferably from about 9 inches to about 18 inches. If the member is a roll, it may range in width from about 9 inches to about 50 inches. Preferably it ranges in width from about 9 inches to about 36 inches. The member can be further treated by sanding on one or both sides and applying code markings or other timing markings along one or both edges.

The resulting seamless intermediate transfer member shows both desirable surface resistivity of greater than about $10^7$ ohms/square and bulk resistivity of less than about $10^{12}$ ohms-cm. The volume/bulk resistivities and surface resistivities of the intermediate transfer member of the present invention allow for different electrical potentials to be applied at the different photoreceptor stations to transfer toner onto the intermediate member and from the intermediate member to a substrate such as paper. The resistivities of the intermediate transfer member of the present invention also produce greater latitude in preventing pre-nip voltage breakdown which results in pretoner transfer leading to toner scatter and image defects. The resulting seamless intermediate transfer member also has a good dielectric constant ranging from about 7 to about 11. Such electrical properties provide for transfer of substantially all toner from the photoreceptor to the intermediate member and from the intermediate member to a substrate (e.g., paper or polyester transparency). The intermediate transfer member also shows good mechanical properties with a tensile modulus ranging from about 400,000 to more than 1,000,000 psi. Such mechanical properties reduce the chances of dimensional change of the intermediate member during the electrophotographic process, thus preventing image distortion on the printed substrate.

The seamless intermediate transfer member can be employed in an electrophotographic imaging system for electrostatic transfer of a toner image wherein the system comprises at least one image forming device. Typically, four image forming devices are utilized. The image forming devices may each comprise an image receiving member in the form of a photoreceptor about which are positioned image forming components of the imaging structure. The image forming components further comprise exposure structures, developing structures, transfer structures, cleaning structures and charging structures. Charging structures can comprise conventional corona discharge devices. The intermediate transfer member of the invention, such as an intermediate transfer belt, is supported for movement in an endless path such that incremental portions thereof move past the image forming components for transfer of an image from each of the image receiving members. Each image forming component is positioned adjacent the intermediate transfer member for enabling sequential transfer of different color toner images to the intermediate transfer member in superimposed registration with one another.

Exposure structures employed can be any suitable type employed in the art. Typical exposure structures employed, include but are not limited to, raster input/output scanning devices (RIS/ROS) or any combination using the RIS/ROS devices. The light source employed can be any suitable light source employed in the art, such as a laser.

The intermediate transfer member moves such that each incremental portion thereof first moves past an image forming component. A color image component corresponding to a yellow component of an original document to be copied may be formed on the image receiving member (photosensitive drum or photoreceptor) using the charging structure, the exposure structure and the developing structure. The developing structure develops a yellow toner image on the image receiving member. That member rotates and contacts the intermediate transfer member. A transfer structure, which can comprise a corona discharge device, serves to effect transfer of the yellow component of the image at the area of contact between the receiving member and the intermediate transfer member.

In like fashion, magenta, cyan and black image components corresponding to magenta, cyan and black components of the original document also can be formed on the intermediate transfer member one color on top of the other to produce a full color image.

The intermediate transfer member is moved through a transfer station where the multicolored image is electrostatically transferred to a transfer sheet or copy sheet. The transfer sheet or copy sheet itself may be electrostatically charged with a corotron device at the transfer station. The transfer sheet or copy sheet is moved into contact with the toner image at the transfer station. The sheet is advanced to the transfer station by any suitable sheet feeding apparatus. For example, feed rollers rotate so as to advance the uppermost sheet from a stack of sheets into contact with the intermediate transfer member in timed sequence so that the toner powder image thereon contacts the advancing sheet at the transfer station. At the transfer station, a Biased Transfer Roll (BTR) is used to provide good contact between the sheet and the toner image during transfer. A corona transfer device also can be provided for assisting the BTR in effecting image transfer. These imaging steps can occur simultaneously at different incremental portions of the intermediate transfer member.

Suitable devices in which the intermediate transfer member of the present invention can be employed include, but are not limited to, devices described in U.S. Pat. Nos. 3,893,761; 4,531,825; 4,684,238; 4,690,539; 5,119,140; and 5,099,286, all hereby incorporated herein by reference. The intermediate transfer member of the present invention can dissipate charge between toner image stations. It achieves good transfer efficiencies and has non-stretch characteristics enabling good registration of a toner image.

The following example is provided to further illustrate and describe the invention and is not intended to limit the scope of this invention. Other embodiments and modifications can be made by those of skill in the art without departing from the spirit and scope of this invention.

EXAMPLE 1

A monofilament polyamide reinforcing member about 0.001 inches in diameter is wound around a mandrel of polyethylene.

The reinforcing member is then coated with a coating solution prepared by dissolving a film forming polymer in a solvent along with additives which regulate the electrical properties of the resulting seamless intermediate transfer member. Specific conditions and materials for coating are as follows:

Film forming polymer: 28 grams of polyvinylidene fluoride resin
Pigment: 1.5 grams of copper phthalocyanine.
Solvent: 522 grams of methyl ethyl ketone
Relative humidity: 42%
Drum Surface Speed: 72 inches per second
Nozzle to Drum Distance: 8 inches
Number of Gun Passes: 15
Fluid Nozzle: 63B (nozzle designation)
Air Nozzle: 63 PE (nozzle designation)
Needle Setting: 1.5
Fluid Feed Mode: Pressure Pot
Ford No. 2 Cup Viscosity: 26 seconds
Mandrel: a polyethylene tube having a smooth outer surface, a length of 12 inches, a diameter of 6 inches and a thickness of
about 1/16 of an inch.

The coating solution is sprayed onto the reinforcing member using a model 21 spray gun and a thin uniform layer is built up on the reinforcing member by repeated spray passes. After the desired thickness is obtained, the belt is dried at ambient temperatures overnight and then oven dried at about 100° C. The resulting intermediate transfer member is released from the mandrel upon cooling to room temperature. Bar code markings are placed along one edge. The surface resistivity is about $10^{10}$ ohms/square and the bulk resistivity is about $10^{11}$ ohms-cm. The tensile modulus is about 750,000 psi.

EXAMPLE 2

An aromatic polyamide (Kevlar, type 29 aramid fiber available from E. I. du Pont de Nemours) is woven into a sleeve and stretched to fit over a 12 inch diameter mandrel made of stainless steel. The surface of the mandrel is coated with a silicone release layer.

The reinforcing member is then coated with a coating solution prepared by dissolving a film forming polymer in a solvent along with additives which regulate the electrical properties of the resulting seamless intermediate transfer member. Specific conditions and materials for coatings are as follows:

Film forming polymer: 96 grams of polycarbonate resin
Pigment: 4 grams of carbon black
Solvent: 500 grams of methylene chloride and 600 grams of
1,1,2 trichloroethane
Relative humidity: 42%
Drum Surface Speed: 72 inches per second
Nozzle to Drum Distance: 10 inches
Number of Gun Passes: 15
Fluid Nozzle: 63B (nozzle designation)
Air Nozzle: 63 PE (nozzle designation)
Needle Setting: 1.5
Fluid Feed Mode: Pressure Pot
Ford No. 2 Cup Viscosity: 28 seconds The coating solution is sprayed onto the reinforcing member using a model 21 spray gun and a thin uniform layer is built up on the reinforcing member by repeated spray passes. After the desired thickness is obtained, the belt is dried at ambient temperatures overnight and then oven dried at about 100° C. The resulting intermediate transfer member is released from the mandrel upon cooling to room temperature. Bar code markings are placed along one edge. The surface resistivity is about $10^8$ ohms/square and the bulk resistivity is about $10^{11}$ ohms-cm. The tensile modulus is greater than 1 million psi.

What is claimed is:

1. A process for making a seamless reinforced intermediate transfer member, comprising:
(a) forming a reinforcing member;
(b) embedding a filler material and dispersed particles of an electrical property regulating material into the reinforcing member at a volume loading of said regulating material to provide conductive pathways above the percolation threshold of said member; and
(c) solidifying the filler material and electrical regulating material to form a seamless reinforced intermediate transfer member.

2. The process of claim 1, wherein the filler material is a polymer.

3. The process of claim 2, wherein the polymer comprises polyvinyl fluoride, polyvinylidene fluoride, polytetrafluoroethylene, polyurethane, polyester, polycarbonate copolymers, polycarbonate terpolymers or a blend thereof.

4. The process of claim 1, wherein the filler material and electrical property regulating material are solidified by drying.

5. The process of claim 4, wherein drying temperatures range from about 20° C. to about 300° C.

6. The process of claim 1, further comprising the step of curing the reinforcing member.

7. The process of claim 1, wherein the reinforcing member comprises natural fibers.

8. The process of claim 7, wherein the natural fibers comprise cotton, flax, silk, wool or a combination thereof.

9. The process of claim 1, wherein the reinforcing member comprises metal.

10. The process of claim 9, wherein the metal comprises copper, tin, lead, cobalt, chromium, nickel, silver, gold, titanium, tungsten molybdenum or an alloy thereof.

11. The process of claim 9, wherein the metal comprise steel or stainless steel.

12. The process of claim 1, wherein the reinforcing member comprises synthetic material.

13. The process of claim 12, wherein a synthetic material comprises aromatic polyamides, aliphatic polyamides, rayon, polyester or a mixture thereof.

14. The process of claim 1, wherein the reinforcing member comprises glass fibers.

15. The process of claim 1, wherein the reinforcing member comprises graphite.

16. The process of claim 1, wherein the transfer member is a belt.

17. The process of claim 1, wherein the transfer member is a roll.

18. The process of claim 1, wherein the filler material is applied to the reinforcing member by a method comprising spray coating, dip coating, wire wound rod coating, powder coating, electrostatic spraying, fluidized bed coating or blade coating.

19. The process of claim 1, wherein the filler material is embedded in the reinforcing member.

20. The process of claim 1, wherein the filler coats a surface of the reinforcing member.

21. The process of claim 1, wherein the filler completely covers the reinforcing member.

22. The process of claim 1, wherein the electrical property regulating material is applied to the reinforcing member by a method comprising spray coating, powder coating, dip coating or electrostatic spraying.

23. The process of claim 1, wherein the electrical property regulating material is embedded in the reinforcing member.

24. The process of claim 1, wherein the electrical property regulating material is coated on the reinforcing member.

25. The process of claim 1, wherein the electrical property regulating material is mixed with the filler material before they are applied to the reinforcing member.

26. The process of claim 1, wherein said electrical property regulating material is selected from the group consisting of pigments, quaternary ammonium salts, dyes and conductive polymers.

27. The process of claim 1, wherein said electrical property regulating material is selected from the group consisting of copper phthalocyanine and carbon black.

28. A process for making a seamless reinforced intermediate transfer member, comprising:

forming a reinforcing member of fibrous material having a first end and a second end;

weaving the first and second ends to form an endless configuration;

embedding a film forming polymer containing electrical property regulating material in the reinforcing member to form a seamless reinforced intermediate transfer belt with conductive pathways above the percolation threshold of said member.

29. The process of claim 28, wherein said electrical regulating material is selected from the group consisting of pigments, quaternary ammonium salts, dyes and conductive polymers.

30. The process of claim 28, wherein said electrical property regulating material is selected from the group consisting of copper phthalocyanine and carbon black.

31. A process for making a seamless reinforced intermediate transfer member, comprising:

(a) forming a reinforcing member;

(b) providing an electrical property regulating material at a volume loading so as to provide conductive pathways in said transfer member above the percolation threshold of said member;

(c) embedding a filler material and dispersed particles of said electrical property regulating material into the reinforcing member at said volume loading of said regulating material; and (d) solidifying the filler material and electrical regulating material to form a seamless reinforced intermediate transfer member.

32. The process of claim 31, wherein said electrical property regulating material is selected from the group consisting of pigments, quaternary ammonium salts, dyes and conductive polymers.

33. The process of claim 31, wherein said electrical property regulating material is selected from the group consisting of copper phthalocyanine and carbon black.

* * * * *